(12) United States Patent
Kelly (10) Patent No.: US 12,036,947 B2
(45) Date of Patent: Jul. 16, 2024

(54) METHOD AND SYSTEM FOR RELAY ATTACK PREVENTION USING SUBZONES

(71) Applicant: Robert Bosch (Australia) Pty. Ltd., Clayton (AU)

(72) Inventor: Matthew S. Kelly, Clayton (AU)

(73) Assignee: Robert Bosch (Australia) Pty. Ltd. (AU)

(*) Notice: Subject to any disclaimer, the term of this patent is extended or adjusted under 35 U.S.C. 154(b) by 320 days.

(21) Appl. No.: 17/312,042

(22) PCT Filed: Dec. 10, 2019

(86) PCT No.: PCT/AU2019/051357
§ 371 (c)(1),
(2) Date: Jun. 18, 2021

(87) PCT Pub. No.: WO2020/118362
PCT Pub. Date: Jun. 18, 2020

(65) Prior Publication Data
US 2022/0024412 A1 Jan. 27, 2022

(30) Foreign Application Priority Data
Dec. 10, 2018 (AU) .................. 2018904684

(51) Int. Cl.
*B60R 25/24* (2013.01)
*H04B 17/27* (2015.01)
(Continued)

(52) U.S. Cl.
CPC .......... *B60R 25/245* (2013.01); *H04B 17/27* (2015.01); *H04B 17/318* (2015.01); *H04W 4/021* (2013.01); *H04W 12/122* (2021.01)

(58) Field of Classification Search
None
See application file for complete search history.

(56) References Cited

U.S. PATENT DOCUMENTS

2010/0321154 A1* 12/2010 Ghabra .................. B60R 25/00
340/5.61
2011/0102139 A1 5/2011 Girard, III et al.
(Continued)

FOREIGN PATENT DOCUMENTS

GB 2511377 9/2014

OTHER PUBLICATIONS

International Search Report from PCT/AU2019/051357, dated Feb. 20, 2020 (4 pages).

*Primary Examiner* — Brandon Hoffman
(74) *Attorney, Agent, or Firm* — Anderson Gorecki LLP (57) ABSTRACT

A method of detecting if a relay is present in a PEPS system for a vehicle is provided. The PEPS system includes a plurality of predefined subzones within one or more vehicle inclusion zones and the method includes the steps of: (a) transmitting a challenge signal including an LF telegram and CW signals from one or more antennas associated with the vehicle to a key fob, the CW signals being measured by the key fob; and (b) determining if CW signals measured by the key fob meet predetermined magnetic field strength values associated with one or more subzones from a plurality of predefined subzones, the predefined subzones being derived to accept the magnetic field distributions at localised positions within a valid inclusion zone and reject magnetic field distributions generated by a relay at a relay transmitter.

24 Claims, 8 Drawing Sheets

(51) Int. Cl.
*H04B 17/318* (2015.01)
*H04W 4/021* (2018.01)
*H04W 12/122* (2021.01)

(56) References Cited

U.S. PATENT DOCUMENTS

| | | |
|---|---|---|
| 2011/0148573 A1 | 6/2011 | Ghabra et al. |
| 2014/0188348 A1 | 7/2014 | Gautama et al. |
| 2015/0004917 A1* | 1/2015 | Juzswik ............... H04B 17/21 |
| | | 455/67.13 |
| 2016/0027226 A1* | 1/2016 | Gigl .................... G07C 9/28 |
| | | 340/5.61 |
| 2016/0225203 A1 | 8/2016 | Asmar et al. |
| 2016/0267734 A1 | 9/2016 | Hamada et al. |
| 2018/0103414 A1 | 4/2018 | Golsch |
| 2018/0213355 A1 | 7/2018 | Smith et al. |
| 2019/0297457 A1 | 9/2019 | Ledvina et al. |

* cited by examiner

METHOD AND SYSTEM FOR RELAY ATTACK PREVENTION USING SUBZONES

CROSS-REFERENCE TO RELATED APPLICATIONS

This application is a 371 national phase application and claims priority to PCT Patent Application PCT/AU2019/051357, filed Dec. 10, 2019, which claims priority to Australian Patent Application 2018904684, filed Dec. 10, 2018, the content of each of which is hereby incorporated by reference.

TECHNICAL FIELD

The present invention relates to passive entry passive start (PEPS) systems and in particular, detection and/or prevention of relay attacks on PEPS systems in vehicles used to enter and/or start the vehicle.

BACKGROUND OF INVENTION

PEPS systems allow authorised users (with a valid key fob) to lock/unlock and start their vehicle without having to interact with the remote control (i.e., authorised key fob). The PEPS system may unlock or start the vehicle via a manually triggered input request (capacitive sensor, push button, etc.) if the key fob is determined to be in a valid PEPS inclusion zone.

A typical PEPS system defines inclusion zones such that if an authorised key fob is located within the correct inclusion zone then the vehicle will respond to lock/unlock and start requests. PEPS zones can be defined by using low frequency (LF) signal fields emitted from antennas on the vehicle. A received signal strength indicator (RSSI) is typically implemented in the authorised key fob as an abstraction of the magnetic field strength. The PEPS system may define the external inclusion zones and internal inclusion zones using the RSSI signal levels from the various antennas on the vehicle. If an authorised key fob is located within the correct zones, i.e., the RSSI levels correspond to a defined inclusion zone then the vehicle will respond to lock/unlock and start requests.

A problem associated with PEPS systems is that vehicle thieves may utilise what is known as a "relay attack" to steal the vehicle. The relay attack tricks the PEPS system into believing that the thief is an authorised user in a defined inclusion zone.

A relay attack generally requires two thieves ("Thief A" and "Thief B") together with the authorised user (i.e., vehicle owner or other possessor of the key fob) being in the same vicinity. A relay attack involves extending the range of the LF field so that an authorised key fob which is not in proximity of the vehicle will receive the LF challenge signal. "Thief A" carries a relay receiver (to receive the LF signal) and is located close to the vehicle while "Thief B" carries relay transmitter (to retransmit the LF signal) and is located in close proximity to the authorised key fob. In an "analog relay", the relay receiver receives the LF signal then up-converts the frequency to a radio frequency (RF) and transmits it over an RF link to the relay transmitter. The relay transmitter receives the RF signal and then down-converts the RF signal to LF and re-transmits the LF signal to an authorised key fob. Analog relays are independent of the modulation and encoding of the LF signal. Other relay configurations are possible, for example, a "digital relay" where the relay receiver demodulates the LF signal and then the data stream is modulated over RF and transmitted. The relay transmitter demodulates the RF signal and then the data stream is modulated over LF and re-transmitted.

A key fob automatically transmits an RF response upon receiving the LF challenge. The RF response signal will typically transmit between approximately 20-200 m back to the vehicle. If the vehicle receives this response then it will assume that the key fob is in the vicinity of the vehicle and so the request will be authenticated. In addition, the relay attack method may also be applied to extend the range of the RF response range beyond the transmit range of the key fob.

In summary, in a relay attack, thieves are able to enter and start a vehicle when the key fob is outside its normal inclusion zones by relaying messages from one location to another to make the vehicle appear closer to the key fob.

Techniques exist which aim to prevent relay attack by analysis of the PEPS LF and UHF signals, for example, measuring the time of flight, signal vector checks and/or signal superposition, etc. These techniques are generally complicated, ineffective or expensive.

US2011/0148573A1 describes a passive entry system which utilizes measurements of RSSI levels to establish an authentication zone based upon the geometrical shape of the signal radiated from an antenna. However, this approach is only intended to detect an authentication zone and will not detect whether a relay is in use so it will not prevent a relay attack from being successful.

US2016/0027226A1 utilises magnetic field vector data and a motion sensor to calibrate authentication zones.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF INVENTION

According to a first aspect, the present invention provides a method of detecting if a relay is present in a PEPS system for a vehicle, the PEPS system including a plurality of predefined subzones within one or more vehicle inclusion zones, the method including the steps of: (a) transmitting a challenge signal including an LF telegram and CW signals from one or more antennas associated with a vehicle to a key fob, the CW signals being measured by the key fob; and (b) determining if the CW signals measured by the key fob meet predetermined magnetic field strength values associated with one or more predefined subzones from a plurality of subzones, the predefined subzones being derived to accept magnetic field distributions at localised positions within a valid inclusion zone and reject magnetic field distributions generated by a relay at a relay transmitter.

When multiple LF antennas in different locations within a vehicle are used to sequentially transmit LF signals, the magnetic fields from each of the vehicle antennas form a magnetic field distribution. It becomes extremely difficult for a relay to reproduce the magnetic field distribution that occurs at the vehicle when multiple vehicle LF antennas are used.

Preferably, the PEPS system includes one or more inclusion zones and a plurality of subzones are contained within the inclusion zones.

It will be appreciated the magnetic field strength may be represented by an RSSI measurement level.

Advantageously, defining an inclusion zone using many, smaller subzone areas of known magnetic field distribution (known RSSI magnitudes from multiple antennas) within the inclusion zone allows identification of a relay based on the tightly defined RSSI subzones. There may be a large number of subzones within an inclusion zone, with each of the subzones having a range of RSSI values (from each antenna) which varies depending on the position within the inclusion zone. In an alternative, the plurality of subzones (i.e. the complete set of subzones) may entirely define the inclusion zone.

Preferably, the subzone is sized based on a relationship between total number of subzones used and an allowable RSSI variation value within each subzone. The present invention allows creation of subzones whereby an acceptable RSSI variation is applied to measurements taken around a vehicle to define the subzones. The subzones define the magnetic field distribution within small volumes of space—meaning that a relay attack would need to generate the RSSI field distribution in what is a small subzone. It will also be appreciated that while it is convenient to first decide on an acceptable RSSI variation to determine the subzone size, equally, this process could be reversed by first deciding on a subzone size and then determining the RSSI variation.

Preferably there is overlap of subzones, so that if, for example, there is a tightly packed space of a number of subzones there is negative space or gaps between. In a further advantage, by polling the LF challenge signal the method can determine whether key fob movement between adjacent subzones has occurred.

The subzones may be assigned a predefined size and the predefined may be based on expected RSSI variations associated within the key fob located in different positions within the subzone. The subzones may have the same size or they may vary by distance to the one or more antennas.

Preferably, the challenge signal is transmitted as a low frequency LF signal. The response signal from the key fob may be transmitted as a radio frequency RF signal. Signals other than CW signals may be transmitted by the vehicle antennas for the magnetic field strength measurements.

According to a second aspect, the present invention provides a system for detecting if a relay is present in a PEPS system for a vehicle, the PEPS system including a plurality of predefined subzones within one or more vehicle inclusion zones, including: one or more antennas associated with the vehicle for transmitting a challenge signal from the one or more antennas to a key fob and one or more controllers configured to: (a) transmit a challenge signal including an LF telegram and CW signals from one or more antennas associated with the vehicle to a key fob, the CW signals being measured by the key fob; (b) determine if the CW signals measured by the key fob meet predetermined magnetic field strength values associated with one or more subzones from a plurality of predefined subzones, the predefined subzones being derived to accept the magnetic field distributions at localised positions within a valid inclusion zone and reject magnetic field distributions generated by a relay at a relay transmitter.

According to a third aspect, the present invention provides a method of creating subzones within one or more vehicle inclusion zones in a vehicle PEPS system for use in detecting if a relay is present in the PEPS system including the steps of: (a) predefining an acceptable RSSI variation within a subzone for CW transmissions from the vehicle antennas; (b) transmitting a challenge signal from one or more antennas associated with the vehicle to a key fob; (c) the key fob measuring the magnetic field strength of the challenge signal at the location of the vehicle inclusion zones; (d) creating a subzone based on the measured signals, the tolerance of the measured signals and the predefined variation associated with the RSSI measurement level within the subzone; (e) storing the magnetic field strength values and variation associated with the challenge signal; and (f) repeating steps (b) to (e) to ensure that subzones are created for the complete inclusion region.

According to a fourth aspect, the present invention provides a method of detecting if a relay is present in a PEPS system for a vehicle, the PEPS system including a plurality of predefined relay subzones for one or more vehicle inclusion zones, the method including the steps of: (a) transmitting a challenge signal including an LF telegram and CW signals from one or more antennas associated with the vehicle to the key fob, the CW signals being measured by the key fob; and (b) determining if the CW signals measured by the key fob meet predetermined magnetic field strength values associated with one or more predefined relay subzones from a plurality of relay subzones, the predefined relay subzones being derived to accept the magnetic field distributions at the relay transmitter and reject magnetic field distributions generated at the vehicle inclusion zone.

According to a fifth aspect, the present invention provides a system for detecting if a relay is present in a PEPS system for a vehicle, the PEPS system including a plurality of predefined relay subzones for one or more vehicle inclusion zones, including: one or more antennas associated with the vehicle for transmitting a challenge signal from the one or more antennas to a key fob and one or more controllers configured to: (a) transmit a challenge signal including an LF telegram and CW signals from one or more antennas associated with a vehicle to a key fob, the CW signals being measured by the key fob; (b) determine if the CW signals measured by the key fob meet predetermined magnetic field strength values associated with one or relay subzones from a plurality of predefined relay subzones, the predefined relay subzones being derived to accept the magnetic field distributions at the relay transmitter and reject magnetic field distributions generated at the vehicle inclusion zone.

According to a sixth aspect, the present invention provides a method of creating relay subzones for one or more vehicle inclusion zones in a vehicle PEPS system, for use in detecting if a relay is present in the PEPS system including the steps of: (a) predefining an acceptable RSSI variation within a relay subzone for CW transmissions from the vehicle antennas; (b) inserting a relay between the vehicle and a key fob; (c) transmitting a challenge signal from one or more antennas associated with the vehicle to a key fob; (d) the key fob measuring the magnetic field strength of the challenge signal at the location of the relay transmitter; (e) creating a relay subzone based on the measured signals and the predefined variation associated with the RSSI measurement level within the subzone, wherein the relay subzones do not contain valid RSSI measurement values found at the location of the vehicle; and (f) storing the magnetic field strength values and variation associated with the challenge signal.

It will be appreciated that the preferable features of the first aspect may also be applied to each of the remaining aspects. It will be appreciated that a controller can be located in the vehicle only or in both the vehicle and key fob.

DETAILED DESCRIPTION

The present invention relates to vehicle PEPS (Passive Entry Passive Start) systems which allow the vehicle owner to lock/unlock and start/stop their vehicle without having to interact with the key fob. It will be convenient to describe the invention in terms of a key fob, however, as will be appreciated by the skilled person, a portable device other than, or in addition to, key fobs may implement the aspects of the invention (such as mobile communication devices and the like).

Figure 1:
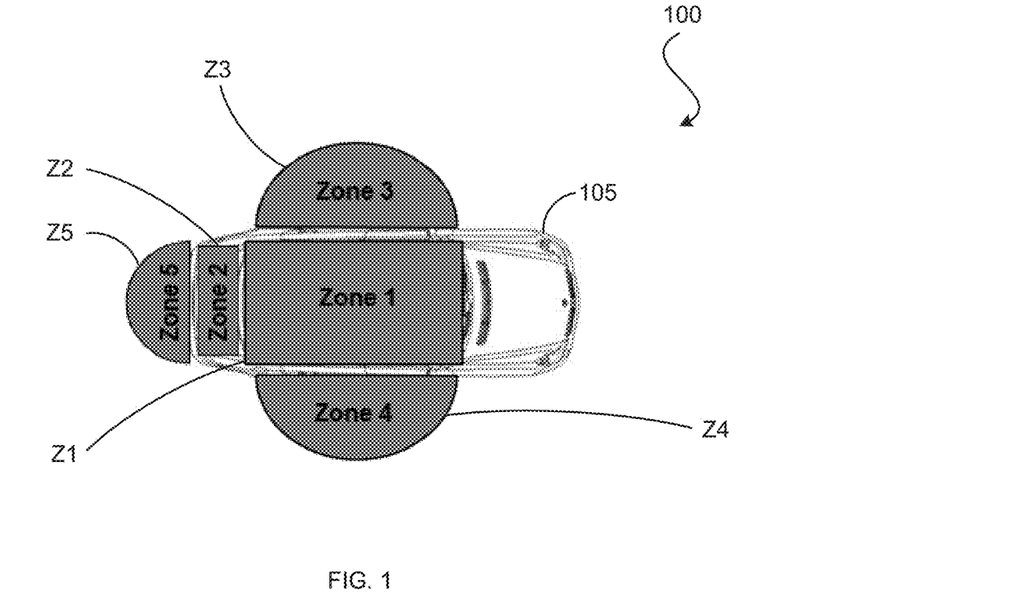
FIG. 1 is a schematic diagram illustrating inclusion zones on a vehicle with a PEPS system.

As shown in FIG. 1, a typical PEPS system 100 on a vehicle 105 defines a number of inclusion zones. For example, three external inclusion zones, Z3, Z4 and Z5 as well as two internal inclusion zones Z1 and Z2 as shown in FIG. 1. If a valid key fob is located within the correct inclusion zones, Z1 to Z5 then the vehicle will respond to lock/unlock and start requests. For example, if a request to unlock is made from the driver's door then the system will check the driver's side inclusion zone Z4 for a valid key fob. These inclusion zones are typically in the order of 1 to 3 meters from the vehicle.

Figure 2:
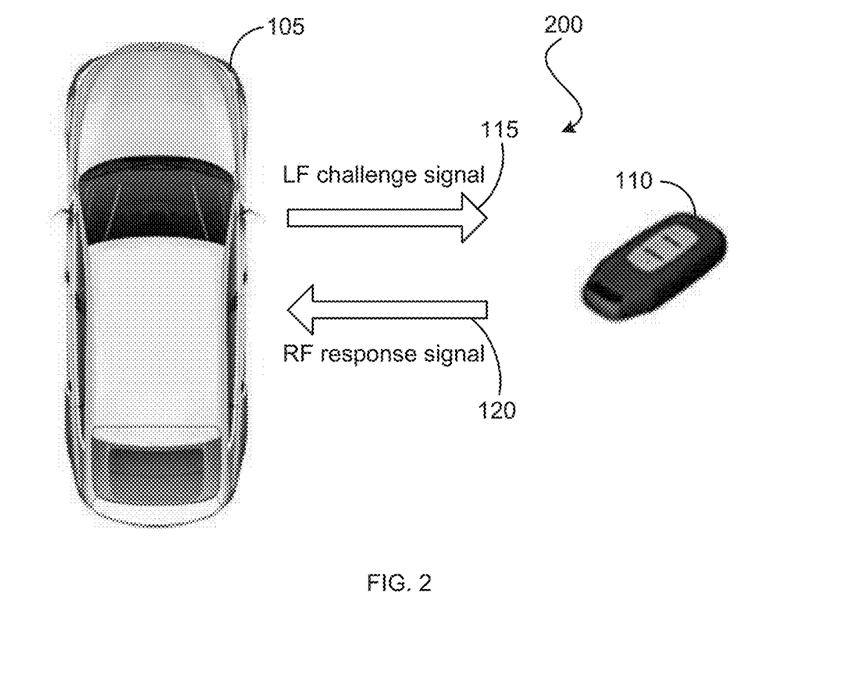
FIG. 2 is a schematic diagram illustrating a vehicle PEPS system.

FIG. 2 is a schematic diagram illustrating a vehicle PEPS system 200. The PEPS system 200 allows a vehicle owner (or possessor of the key fob) to lock/unlock and start a vehicle 105 without having to interact with the key fob 110. Typical PEPS systems define external inclusion zones and internal inclusion zones. If a key fob 110 is located within an inclusion zone then the vehicle 105 will execute lock/unlock and start requests.

The PEPS inclusion zones may be defined by low frequency (LF) signal magnetic fields emitted from antennas on the vehicle. Received signal strength indicator (RSSI) can be utilised in the key fob and the PEPS system may define the external inclusion zones and internal inclusion zones using the RSSI signal levels measured from the various antennas on the vehicle 105. Then, if a key fob 110 is located within the correct zones (i.e., the RSSI levels correspond to a defined inclusion zone) then the vehicle 105 will respond to the lock/unlock and start request.

PEPS systems may be designed to have manually triggered unlock and start requests (such as a capacitive sensor, push button and the like provided for example, in the handle of the vehicle, or in the vehicle Start/Stop button 105) to initiate transmission of the LF challenge signal 115 to the key fob 110. As part of the LF challenge signal 115, signals are transmitted from several (or all) of the vehicle antennas. If a key fob 110 is located within the expected inclusion zones (based on the RSSI values measured from the vehicle antennas), after receiving the LF challenge signal 115 it will transmit an authentication response signal on a radio frequency (RF) 120 for the request to be processed in the vehicle. It will be appreciated that bi-directional RF communication may also be used.

Some PEPS systems also provide permanent periodically transmitted LF challenge signals 115 prior to the manually triggered unlock request. For these systems, the vehicle 105 can determine when the key fob 110 is in the vicinity of the vehicle before an unlock request is made. The advantage of this is that it can improve system response times and provide additional features such as comfort lighting as the owner approaches the vehicle 105.

Figure 3:
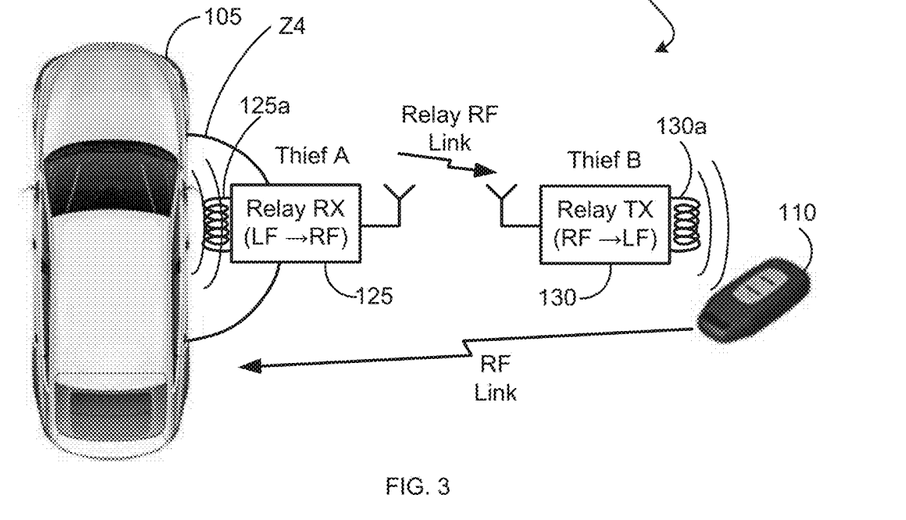
FIG. 3 is a schematic diagram illustrating a relay attack on a vehicle having a PEPS system.

As shown in the FIG. 3, the PEPS system 300 is vulnerable to theft due to what is known as "relay attack". The present invention attempts to prevent a relay attack from being successful. In FIG. 3, the relay attack involves extending the range of the LF field (shown in FIG. 2) so that a key fob 110 which is not in proximity of the vehicle 105 will receive the LF challenge signal. The relay attack requires two thieves, Thief A and Thief B where Thief A carries a relay receiver (Relay RX) 125 and is located close to the vehicle 105 while Thief B carries a relay transmitter (Relay TX) 130 and is located close to the key fob 110.

Relay RX 125 receives an LF signal from vehicle 105 and then up-converts the frequency to an RF frequency and transmits it via RF link to Relay TX 130. Relay TX 130 receives the RF signal and then down-converts the frequency to LF and re-transmits the LF signal to the key fob 110. This scenario describes the previously defined "analog relay", however, other types of relay topologies could be used. The key fob 110 automatically transmits an RF response upon receiving the LF challenge. The RF response signal will typically transmit between approximately 20-200 m back to the vehicle 105. If the vehicle 105 receives this response it will assume that the key fob 110 is in the vicinity of the vehicle 105 and so the request will be authenticated. In addition, the relay attack method may also be applied to extend the range of the RF response range beyond the transmit range of the key fob 110.

Figure 4:
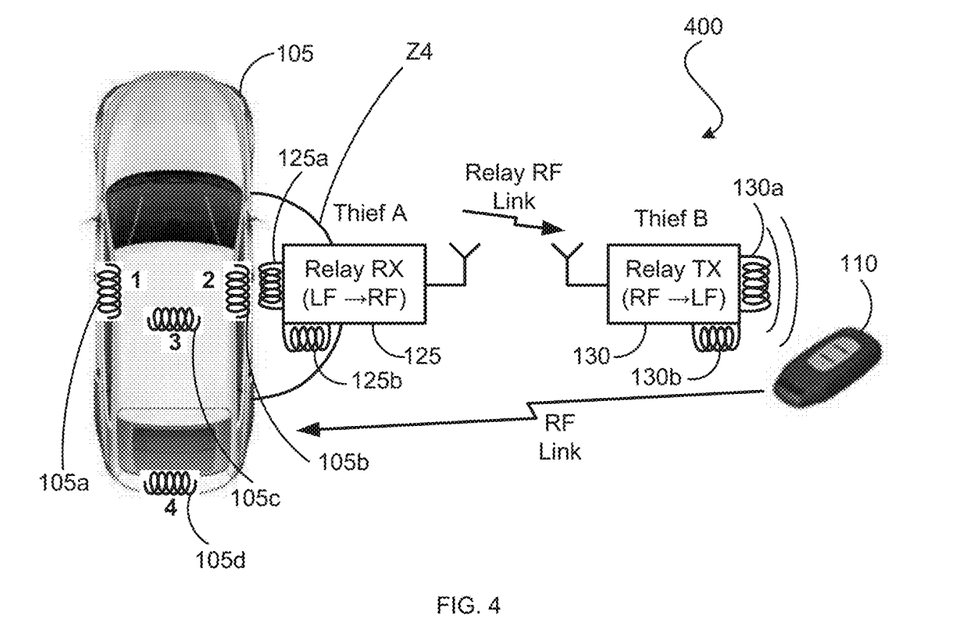
FIG. 4 is a schematic diagram illustrating a relay attack on a vehicle having a PEPS system where the receive and transmit relays have two antennas mounted orthogonally to each other.

The relay attack shown in FIG. 3 is the simplest version of a relay attack. However, in operation as shown in FIG. 4, a vehicle 105 has several antennas in the vehicle 105 typically mounted in two orientations in relation to each other, i.e., parallel or orthogonal to each other. As shown in FIG. 4, typical antenna orientations for a vehicle 105 may be for example antenna 105a, 105b parallel to each other and located in the door handles while antenna 105c, 105d are parallel to each other and are located in the cabin and trunk of the vehicle respectively (although it will be appreciated that there may be more vehicle antennas provided). For a vehicle such as this a relay needs two antennas mounted orthogonally to each other in order to effectively couple energy from the vehicle antennas into the Relay RX for both vehicle antenna orientations and for the Relay TX to attempt to effectively reproduce the LF field distribution at the vehicle. In practice, a relay attack may involve a relay receiver 125 having antennas 125a and 125b and relay transmitter 130 having antennas 130a and 130b to replicate the antenna orientations in the vehicle 105.

In practice, it is extremely difficult for a relay 125 and 130 to reproduce the magnetic field distribution (i.e., the RSSI relationship between each of the vehicle antennas) that occurs at the vehicle 105, that is to say it is very difficult to develop a perfect relay. The magnetic fields generated by the different vehicle antennas have specific magnitude relationships that can be much more tightly defined when small subzones, such as those of the present invention are provided, rather than say for a typical large inclusion zone. The system and method of determining whether a relay is in use of the present invention relies on using the LF CW (continuous wave) RSSI signal magnitudes measured by the key fob from different vehicle antennas and determining whether the RSSI values are contained within a predetermined series of allowed and/or disallowed conditions (based on RSSI signal magnitudes) from a small subzone within a large inclusion zone.

Figure 5A:
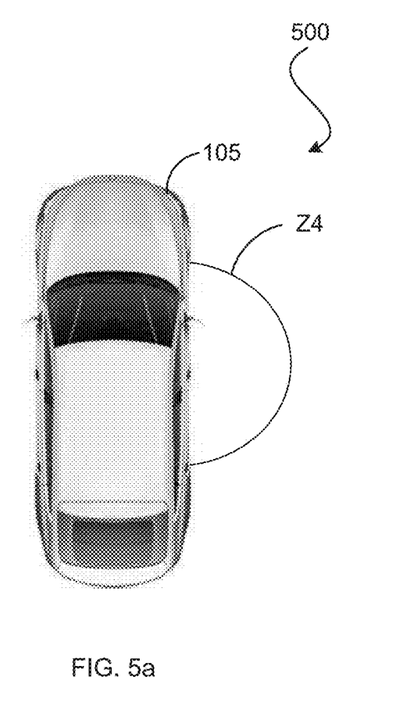
FIGS. 5a and 5b are schematic diagrams illustrating an inclusion zone and subzones on a vehicle with a PEPS system.

FIG. 5a is a schematic diagram 500 illustrating a vehicle 105 with a large area inclusion zone Z4. It will be appreciated that there may be more than one inclusion zone as noted with respect to FIG. 1. Each inclusion zone, for example, Z4 which may equate to a right side entry zone of the vehicle, is in the present invention considered to be made of smaller subzones SZ1 to SZn as shown in the schematic 505 of FIG. 5b and schematic 700 of FIG. 7.

When multiple vehicle LF antennas are used, it becomes extremely difficult for a relay to reproduce the magnetic field distribution (i.e., the RSSI signal magnitude relationships between each of the vehicle antennas) that occurs at the vehicle 105 within the subzones SZ1 to SZn. The magnetic fields generated by the different vehicle antennas have specific RSSI signal magnitude relationships that can be tightly defined for each of the subzones SZ1 to SZn which is not possible to achieve if a large inclusion zone such as Z4 of FIG. 5a is used. The smaller the volume of space a subzone occupies the more tightly the specific RSSI signal magnitude relationships can be defined. It will be appreciated that the subzones in FIG. 5a are depicted larger than would be recommended for a practical application in order to clearly illustrate and articulate the method (this fact is discussed in detail in the succeeding description).

Figure 5B:
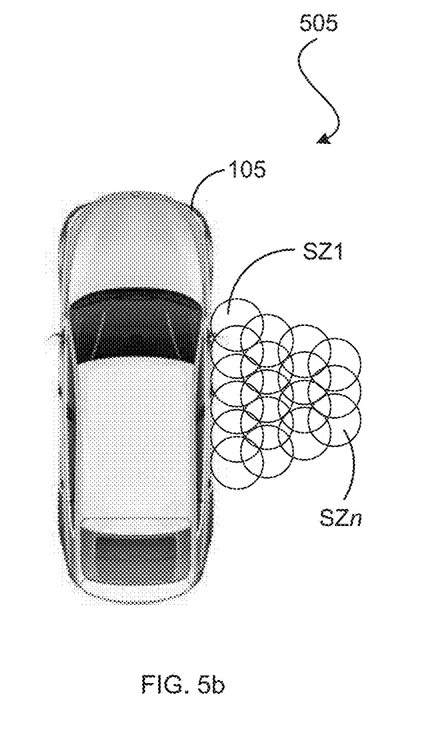

It will be appreciated that the subzones SZ1 to SZn in FIG. 5b are notionally shown in the horizontal plane as overlapping circular zones, however, the subzones SZ1 to SZn may also extend into the vertical plane and, for ease of reference may be visualized as 3D spheres or bubbles. However, it will be appreciated that the subzones may take any shape.

A key fob belonging to the vehicle 105 may be placed within each subzone SZ1 to SZn and associated data (i.e. the key fob measured RSSI magnitudes from each vehicle antenna) are stored from each position measured.

The present invention relies on using the LF CW RSSI signal magnitudes measured by the key fob from different vehicle antennas and determining whether the RSSI values are contained within a predetermined series of allowed and/or disallowed conditions (based on RSSI signal magnitudes) from a subzone SZ1 to SZn. Each subzone SZ1 to SZn is created by first making RSSI measurements from multiple vehicle antennas at a valid PEPS entry or start location.

Figure 6:
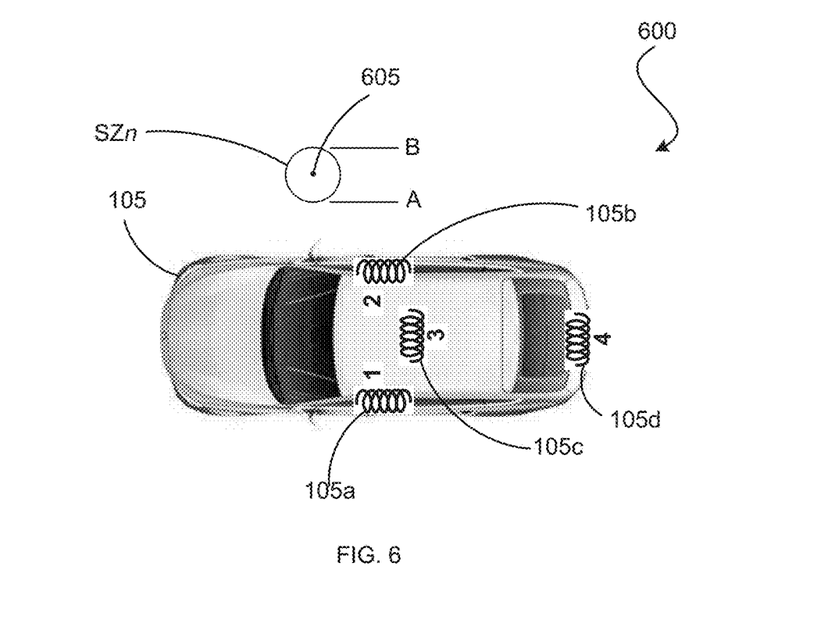
FIG. 6 is a schematic diagram illustrating measurement of a subzone on a vehicle with a PEPS system.

As shown in FIG. 6, an example measurement point 605 is shown, which would be considered to be in an allowed PEPS entry inclusion zone (i.e., theoretically a correct RSSI measurement by the key fob at this location would open the vehicle). This measurement point 605 is then used to construct a subzone SZn (which is notionally depicted in FIG. 6 as a circle) of allowed RSSI values by extrapolating the measurement result. The extrapolation can be made using values obtained experimentally or via theoretical calculations by determining the maximum RSSI variation allowed from a key fob measurement within a subzone.

Preferably a key fob associated with the vehicle 105 is placed at many positions within the entry or start zones for the vehicle and RSSI levels and associated data are stored for each position measured. Essentially, this builds up a data set of RSSI levels of the key fob in different positions. This may be carried out for a particular make or body shape of vehicle. The subzones created from the measurement data set should completely encompass the volume of space in the inclusion zone.

As previously stated, the smaller the volume of space a subzone occupies the more tightly the specific signal magnitude relationships can be defined. It will be appreciated in a preferred embodiment, the subzones define a small volume of the space in an inclusion zone, for example, there may be in the order of thousands of subzones within each inclusion zone (or which essentially define the inclusion zones).

It is desirable to have an optimal number and/or size of subzones in the system. The size of the subzone may be determined empirically, with an acceptable variation of RSSI values for each subzone being selected. So, the larger the accepted variation, the larger the size of the subzone. In addition, the amount of RSSI variation within a subzone of specified area measured from a certain vehicle antenna increases as the distance to the antenna decreases.

As best shown in FIG. 6, point A on subzone SZn is nearer antenna 105b than point B. The magnetic field generated by the LF antenna 105b attenuates at a rate of $1/d^3$ when the source geometry is assumed to be a point source and d is the distance from the source.

For example, if a measurement point 1.5 cm from Antenna 105b is used to create a subzone of 1 cm diameter, then point A is 1 cm from Antenna 105b and point B is 2 cm from Antenna 105B, i.e., the distance of point B is twice the distance as point A from Antenna 105b. Therefore, the magnetic field intensity at point B is $1/d^3=1/2^3=0.125$ or 12.5% of the field intensity measured at point A. However, the next closest antenna to the measurement point, Antenna 105c, if it was, say 120 cm away, then for the subzone of 1 cm diameter, the distance of point B is 120.5/119.5=1.008 the distance as point A from antenna 105b. Therefore, when considering Antenna 105c, the field intensity at point B is $1/d^3=1/1.008^3=0.975$ or 97.5% of the field intensity measured at point A.

In addition, if the measurement point is 50 cm from antenna 105b and a subzone is sized at 1 cm diameter, the distance of point B is 50.5/49.5=1.02 times the distance of point A from antenna 2. Therefore, the field intensity at point B is 1/d3 $1/d^3=1/1.02^3=0.94$ or 94% of the field intensity measured at point A. It is therefore preferable to create smaller subzones (with allowed RSSI variation) when closer to the nearest antenna due to the more pronounced signal variation for a given subzone diameter. Ideally, the closer the subzone is to the antenna, the smaller the subzone should be and in turn the further away the subzone is from the antenna the larger the subzone needs to be.

Figure 7:
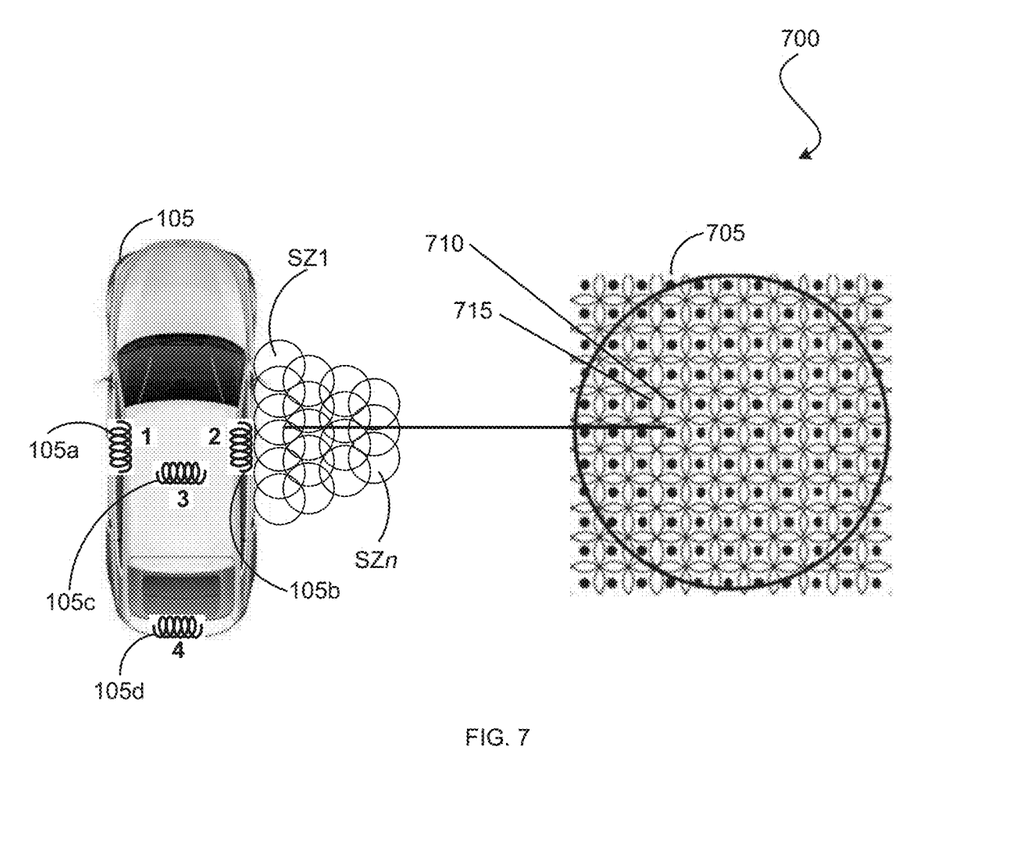
FIG. 7 is a further schematic diagram illustrating subzones on a vehicle with a PEPS system.

In order to better differentiate between valid and invalid RSSI values (for example, in a relay attack) the size of the subzones should be restricted to a size whereby the amount of RSSI variation due to size of the subzone is very tightly constrained. This is accomplished by subdividing each inclusion zone into subzones based on an acceptable RSSI variation. As mentioned previously, the subzones in FIG. 5a are depicted larger than would be recommended for a practical application in order to clearly illustrate and articulate the method. The more subzones the better the relay detection process will be, however, this will also impact on the time required for the controller associated with the vehicle to determine whether a valid or invalid measurement has been made. FIG. 7 shows the measurement points and the subzones created from each point for a more practical representation of the method.

As shown in detail 705, a single measurement point 710 is used to construct a subzone 715—which may be represented as a small "bubble" (although for ease of reference is depicted as a circle in FIG. 7) of "allowed" RSSI values by extrapolating the measurement result. The diameter of each subzone may be experimentally derived by selecting an acceptable variation in RSSI. The size of the subzone may be a compromise between creating as many subzones as possible in order to create tight RSSI relationships (in order to expose a relay) and, on the other hand, using as few subzones as possible (in order to reduce the decision making time for a controller associated with a vehicle). The reason for this is that the RSSI measurement result for every PEPS event needs to be checked with each subzones set of conditions in real time. However, once a measurement result is found to correspond with a subzone, the remaining unchecked subzones do not need to be checked. It will be appreciated that assessing whether the conditions are met may be implemented via a look up table or any other means of evaluation.

Figure 8:
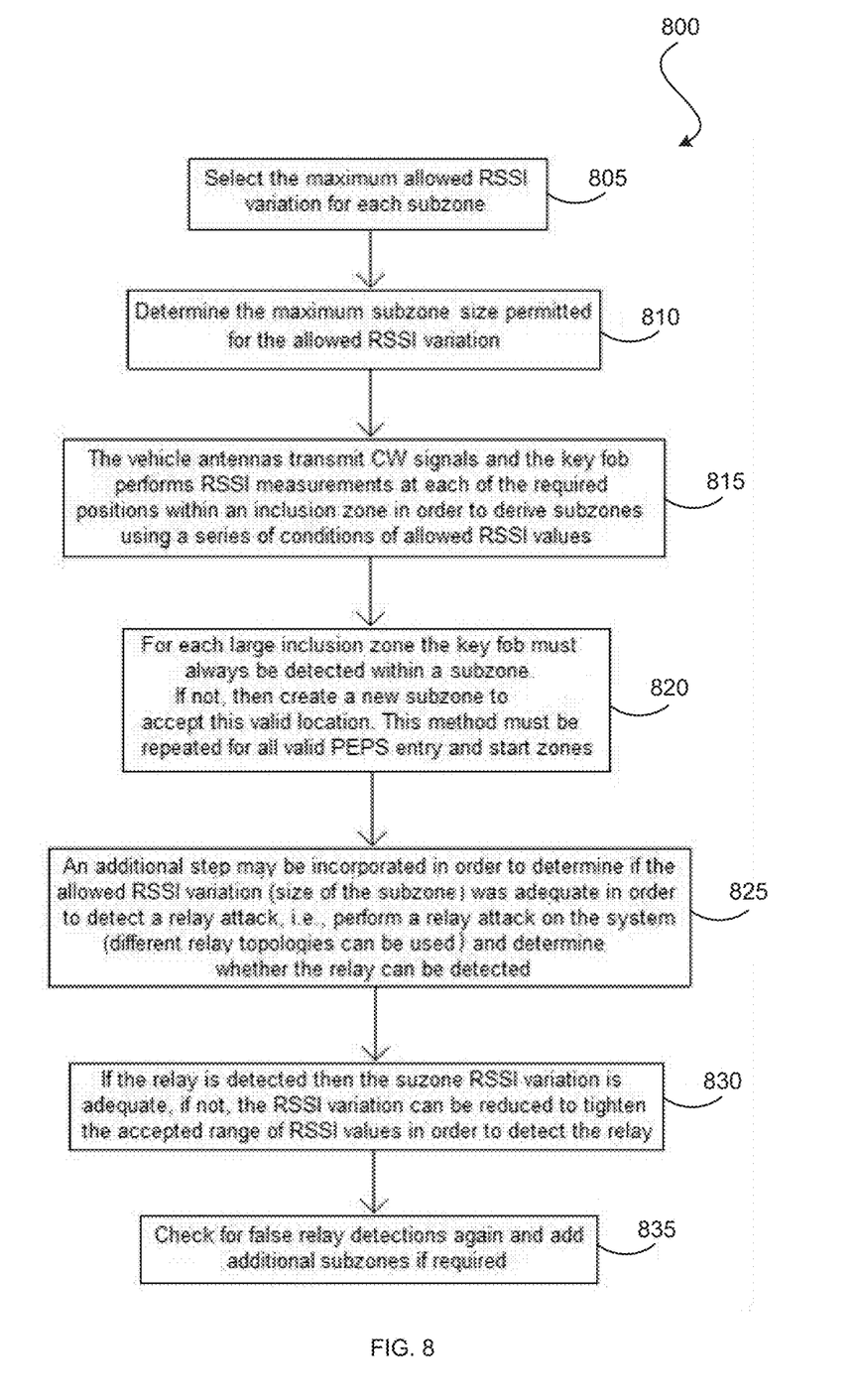
FIG. 8 is a flow diagram illustrating the method of the present invention to create subzones for preventing a relay attack on a vehicle having a PEPS system.

FIG. 8 is a flow diagram 800 illustrating the method of the present invention for creating the subzones in an inclusion zone. At step 805 the maximum allowed RSSI variation from the CW transmissions of the closest vehicle antenna to the inclusion zone is selected for each subzone. The selected RSSI variation may be a trade-off between speed and performance as noted above. Control then moves to step 810 in which the maximum subzone size permitted for the allowed RSSI variation is determined. The RSSI from the CW transmissions of the antenna that is closest to the key fob is measured at specific distances (and RSSI intensity levels). The largest subzone diameter where it is still possible to achieve the specified RSSI variation at different distances from the antenna (closest to the key fob) may then be observed. The RSSI variation within the subzone diameters from the CW transmissions from all of the other antennas may also be observed and stored. It will be appreciated that step 810 can be bypassed and control moves from step 805 to step 815 without predetermining the subzone diameters by selecting the RSSI variation from the CW transmissions from all of the vehicle antennas in step 805. At step 815 the RSSI measurement results from each of the required positions in the large inclusion zones are performed. For each subzone within the inclusion zone a series of conditions of allowable RSSI values from each vehicle antenna is determined.

Control then moves to step 820 in which, for each inclusion zone the key fob must always be detected within a subzone and if not to create a new subzone to accept this valid location. If this is not performed then false relay detections will occur, i.e., each position within the inclusion zone must fall within a subzone. This process is repeated for all valid PEPS inclusion zones. Control then moves to step 825 where, in an optional step, it is determined if the allowed RSSI variation (i.e. size of the subzones) was adequate in order to detect a relay attack. In this step a relay attack may be carried out on the system and different relay topologies may be utilised. Control then moves to step 830 where if a relay is detected then the subzone size is determined as adequate and if not the allowed RSSI variation can be reduced (in order to reduce the subzone size) to tighten the accepted range of RSSI values in order to detect the relay.

Control then moves to step 835 where false relay detections are checked once again and additional subzones are added if required.

In a practical example, the subzone RSSI variation must include the RSSI measurement tolerance in the PEPS system (assume ±10 counts) and the RSSI variation due to the subzone size. The required subzone size needed to achieve an acceptable RSSI variation (including tolerance) may then be determined experimentally. For example, the RSSI from the closest antenna (for example antenna 105b) can be measured at certain distances and intensity magnitudes and the largest subzone diameter where it is still possible to observe the specified RSSI variation can be determined. The RSSI variation from the CW transmissions of the other antennas (105a, 105c and 105d for example) is also observed. For example, the subzone diameters for the predefined RSSI variation at approximately 1 cm, 5 cm, 10 cm, 20 cm, 50 cm and 100 cm and 150 cm from antenna 105b is shown in Table 1. The subzone diameter required and the accepted maximum variation in RSSI from antenna 105b and the other antennas 105a, 105c and 105d are also shown in Table 1.

TABLE 1

| Distance from Antenna 105b (cm) | Subzone diameter (cm) | RSSI measured from Antenna 105b | Variation of RSSI from Antenna 105b within subzone | Variation of RSSI from Antenna 105b within subzone including tolerance | Variation of RSSI from other antennas within subzone | Variation of RSSI from other antennas within subzone including tolerance |
|---|---|---|---|---|---|---|
| 1 | 1 | >750 | ±15 | ±25 | ±20 | ±30 |
| 2 | 1 | >700, <751 | ±15 | ±25 | ±15 | ±25 |
| 5 | 2 | >650, <701 | ±10 | ±20 | ±15 | ±25 |
| 10 | 2 | >600, <651 | ±10 | ±20 | ±10 | ±20 |
| 20 | 5 | >550, <601 | ±5 | ±15 | ±10 | ±20 |
| 50 | 5 | >500, <551 | ±5 | ±15 | ±5 | ±15 |
| 100 | 10 | >400, <501 | ±5 | ±15 | ±5 | ±15 |
| 150 | 20 | <401 | ±5 | | ±5 | |

RSSI values typically relate to the magnetic field by a logarithmic equation, assume this is the case for the example presented. In Table 1, the variation in terms of RSSI obtained from the CW transmissions of all antennas (105a, 105b, 105c and 105d) is approximately the same for the corresponding subzone, for example, for a subzone with diameter of 1 cm (and the RSSI from antenna 105*b* is greater than 750 counts), the variation in RSSI (including tolerance) from Antenna 105*b* is ±25 and ±30 from all other antennas (105*a*, 105*c* and 105*d*). However, due to the logarithmic relationship, the variation in the magnetic field is much larger for larger RSSI values compared to small RSSI values. For two given measurement points near Antenna 105*b*, the magnitude of the RSSI values obtained from Antenna 105*b* are much greater than that of the other antennas and therefore the variation in the magnetic field between the two points is also greater. The RSSI measurement results from each of the required positions in the inclusion zone are used to determine a series of conditions that create each subzone, i.e., a subzone is characterised by a set of conditions that define the RSSI values that can be obtained by a key fob in that subzone. The set of conditions may consist of an upper and lower RSSI limit for each of the measured RSSI values from the vehicle antennas. Alternatively, only an upper or lower limit need be provided and a minimum of one RSSI value is required from each vehicle antenna.

For example, with reference to FIG. 4, a key fob measurement at a point in the inclusion zone Z4 of the vehicle 105 results in RSSI values of 200, 525, 300, and 350 from the CW signals transmitted by the vehicle antennas 104*a*, 105*b*, 105*c* and 105*d* respectively. Given an RSSI from Antenna 105*b* of 525, according to Table 1, we would create a subzone of 5 cm in diameter which would correspond to RSSI values of 185 to 215 for Antenna 105*a*, 510 to 540 for Antenna 105*b*, 285 to 315 for Antenna 105*c* and 335 to 365 for Antenna 105*d* (including tolerance, i.e., ±15 for all antennas).

This range of values corresponds to the following conditional statement: if (RSSI value from Antenna 105*a* is between 185 to 215) AND (RSSI value from Antenna 105*b* is between 510 to 540) AND (RSSI value from Antenna 105*c* is between 285 to 315) AND (RSSI value from Antenna 105*d* is between 335 to 365), then the measurement point is within the defined subzone.

It is critical that the multiple subzones created from the measurement points cover the complete volume of space in an inclusion zone (for example Z4). Gaps in the coverage around the vehicle may result in false relay detection and inadvertently prevent a valid user from entering or starting the vehicle using PEPS.

The above method is applied to as many measurement points as required in order to cover the complete spatial area of the entry or start inclusion zones. For example, for the inclusion zone Z4 (surrounding the driver door on a right hand drive vehicle) it is ensured that when the key fob is in this inclusion zone it is always detected in a subzone. If not, then a new subzone is created to accept this valid location. This method is repeated for all valid PEPS entry and start zones.

It will be appreciated that it is possible to create the subzones without predetermining the subzone diameter. This is achieved by first selecting the maximum subzone RSSI variation allowed from each antenna. Then a first measurement is performed by the key fob at a location in the inclusion zone of the CW signals transmitted by the vehicle antennas. The first subzone is then created using the first measurement and the selected RSSI variation and the RSSI measurement tolerance in the PEPS system. For example, with reference to FIG. 4, a measurement point in the inclusion zone Z4 the vehicle 105 that corresponded to the key fob measuring RSSI values of 200, 525, 300, and 350 from vehicle antennas 104*a*, 105*b*, 105*c* and 105*d* respectively. For this example assume that the maximum subzone RSSI variation from each antenna is selected to be ±5 counts and the measurement tolerance in the PEPS system is ±10 counts. This would correspond to RSSI values (including tolerance) of 185 to 215 for Antenna 105*a*, 510 to 540 for Antenna 105*b*, 285 to 315 for Antenna 105*c* and 335 to 365 for Antenna 105*d*.

This range of values corresponds to the same conditional statement presented previously: if (RSSI value from Antenna 105*a* is between 185 to 215) AND (RSSI value from Antenna 105*b* is between 510 to 540) AND (RSSI value from Antenna 105*c* is between 285 to 315) AND (RSSI value from Antenna 105*d* is between 335 to 365), then the measurement point is within the defined subzone.

After the first subzone is created the keyfob is moved to another location within the inclusion zone where the key fob measures the RSSI values from the CW signal transmitted by vehicle antennas 104*a*, 105*b*, 105*c* and 105*d* respectively. The measured RSSI values are checked to determine whether the conditional statement of the first subzone is true, if true a new subzone is not required. If false, a new subzone needs to be created as previously described. The raw measured values as well as calculated values based on the RSSI tolerance in the PEPS system should be checked. The method may be applied to as many measurement points as required in order to cover the complete spatial area of the entry or start inclusion zones for all possible RSSI tolerances. For example, for the inclusion zone Z4 (surrounding the driver door on a right hand drive vehicle) it is ensured that when the key fob is in this inclusion zone it is always detected in a subzone. If not, then a new subzone is created to accept this valid location. This method is repeated for all valid PEPS entry and start zones.

As previously discussed, the subzones are derived by selecting an acceptable variation in RSSI. This is a compromise between creating as many subzones as possible in order to create tight RSSI relationships (in order to expose a relay) and using as few subzones as possible in order to reduce the decision making time for the controller.

If a relay attack is performed, the magnetic field distribution in each of the defined subzones at the vehicle would typically be different than the field distribution that can be generated by the relay. In this case the RSSI values received would not correspond to any of the subzones and it can be determined that a relay attack is occurring.

An additional step may be performed in order to determine if the allowed RSSI variation (and therefore size of the subzones) was adequate in order to detect a relay attack, i.e., perform an actual relay attack on the system and determine whether the relay can be detected.

If the relay is detected then the subzone size is adequate, if not, the allowed RSSI variation can be reduced (effectively reducing the diameter of the subzone) to tighten the accepted range of RSSI values in order to detect the relay. Then, false relay detections may be checked again and additional subzones may be added if required. Alternatively, specify the RSSI variation value in order to create as many subzones as possible given the maximum allowed subzone search time and the maximum available controller memory.

Figure 9A:
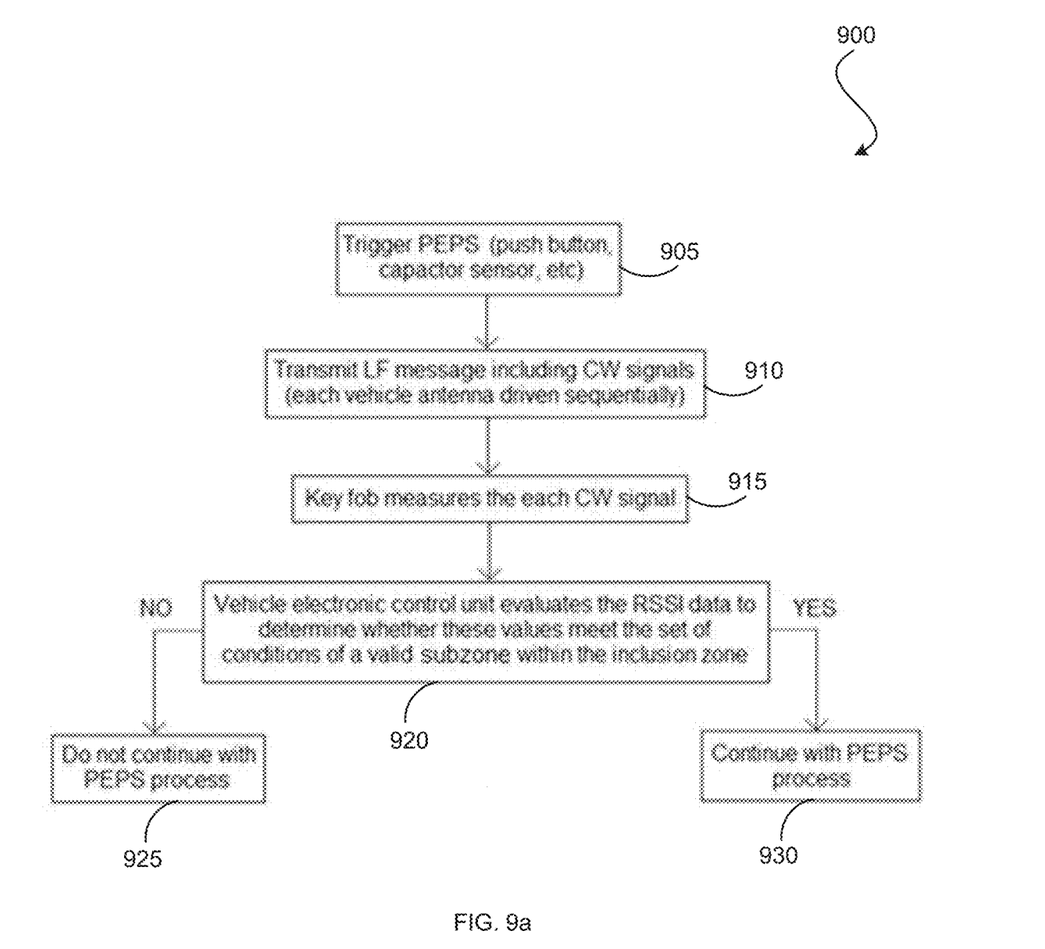
FIGS. 9a and 9b are flow diagrams illustrating the method of the present invention to unlock or start a vehicle according to the system and methods of the present invention.

FIG. 9*a* is a flow diagram 900 illustrating operation of the method of the present invention in which it is determined whether or not a relay is present in a PEPS system for a vehicle. At step 905, a challenge signal is transmitted from the vehicle to a key fob. The challenge signal includes LF CW transmissions from one or more of the vehicle antennas. It will be appreciated that any number of suitable antennas may be used (including all of the vehicle antennas). For example, with reference to FIG. 2, the challenge signal may be emitted from vehicle 105 as challenge signal 115 to key fob 110. Control then moves to step 910 in which the key fob 110 receives the challenge signal 115 and in response to the challenge signal 115 determines at step 915 the magnetic field strength of the LF signals from the vehicle antennas and provides a response signal (shown as 120 in FIG. 1). The response signal 120 is typically an RF signal and contains the RSSI measurements of the magnetic fields at the location of the key fob 110 relative to the vehicle 105.

Control then moves to step 920 where it is determined whether or not the measured magnetic fields strengths (RSSI values) meet the predetermined RSSI values within a particular subzone. The pre-determined magnetic field strength values for a particular subzone are preferably stored in a lookup table or the like associated with a controller in the vehicle 105. It will also be appreciated that the look up table or the like may be stored in the key fob. The controller determines if the RSSI values measured by the key fob 110 are located within any of the defined subzones. Each subzone is defined by a set of conditions (corresponding to the expected RSSI values for each antenna) that defines a range of RSSI values that can be obtained in that subzone. Alternatively, only an upper or lower limit need be provided and a minimum of one RSSI value is required from each vehicle antenna. During the PEPS process, each measurement is compared to the set of conditions of all defined subzones to determine if any statement is true and valid, i.e., the measurement result falls within one or more subzones.

It can then be determined whether or not the key fob 110 meets the conditions (i.e., are the RSSI values valid for one or more of the subzones or do they correspond to a relay attack).

Preferably, to improve the speed of the subzone search, the subzones may be sorted, for example from smallest RSSI to largest. In the context of a vehicle, for example, the driver side door inclusion zone, the subzones may be sorted from the subzone with the smallest driver door RSSI to the largest. The RSSI values from the other vehicle antennas in each subzone can then be used to sort the subzones in a similar fashion. A search can then be carried out. It is critical that the search does not miss any subzones (if the only subzone valid for a particular legitimate PEPS request is missed in the search then the PEPS entry or start request will be aborted) and it is preferable to have the subzones sorted such that search occurs as fast as possible and with minimal resources.

It will be appreciated that the subzones may be searched in any suitable manner, including, for example, a binary search algorithm, hash-table or the like to search the subzones as quickly as possible and improve speed. Advantageously, this allows the system to utilise more subzones and therefore provide improved protection against a relay attack.

If it is determined that the RSSI values measured by the key fob do not meet the criteria then the request is rejected and control moves to step 925 where the key fob is not permitted to enter or start the vehicle. Otherwise if at step 920 it is determined that the measured RSSI values meet one or more criteria then control moves to step 930 where the vehicle may be unlocked or started.

It will be appreciated that the magnetic field strength may be measured in any suitable way such as an RSSI measurement level which is essentially a quantised abstraction of the magnetic field strength.

It will also be appreciated that the method 900 may loop so for example at step 920, criteria may be periodically polled against the key fob 110. It is possible to track the key fob movements as the key fob moves from subzone to subzone. In normal operation the key fob can only move into adjacent subzones, if it is determined that the key fob is detected in a non-adjacent subzone it can also be determined that a relay attack has occurred.

As previously noted, in order to better differentiate between valid and invalid RSSI values (relay attack) the size of the subzones should be restricted to a size whereby the amount of RSSI variation due to size of the subzone is very tightly constrained. The more subzones, the better the relay detection process will be, however, this will also impact on the time required for the controller to determine whether a valid or invalid measurement has been made. In that context, in a given system, there will be a point where a relayed signal cannot be detected and entry and or start will be allowed.

Figure 10:
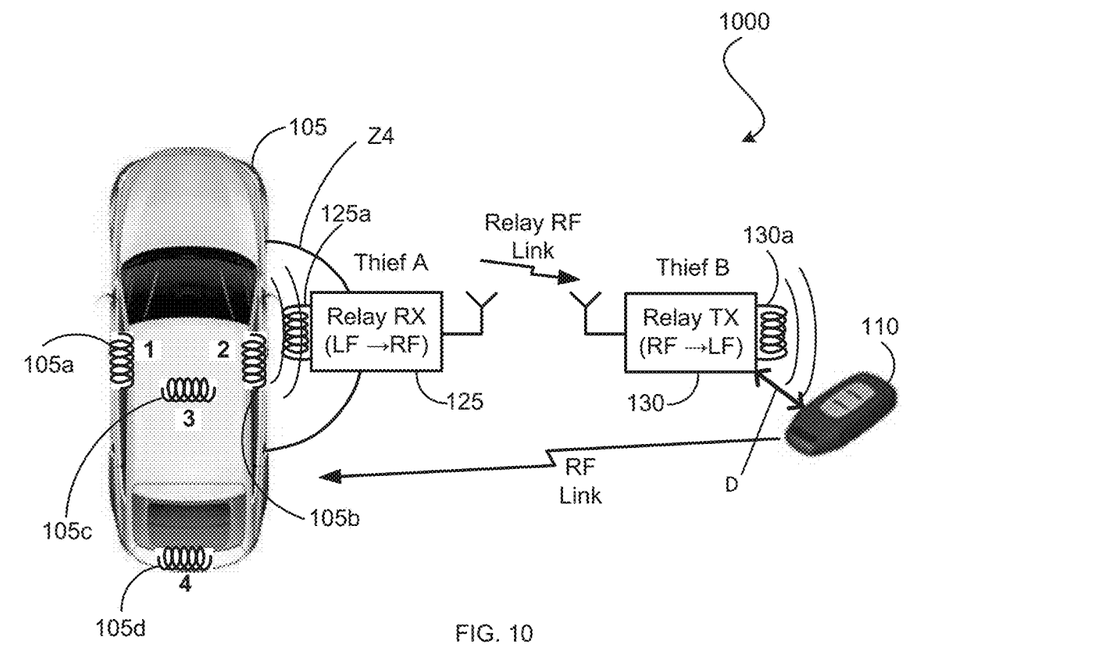
FIG. 10 is a schematic diagram illustrating a relay attack on a vehicle having a PEPS system using the system of the present invention and the maximum distance D the key fob can be from the transmitter (TX) relay where the relay cannot be identified.

For example, as shown in FIG. 10, there is a system 1000 which depicts the relay previously shown in FIG. 3 but this time with an additional parameter displayed, i.e., the maximum distance the key fob 110 can be from the TX relay 130 where a relay cannot be identified because the RSSI that is measured fulfil the set of conditions of at least one subzone.

This may be denoted as the "relay no detection region" and in this example this value is displayed as distance D (which, for example may be in the order of 30 cm). In other words, if the key fob 110 is within 30 cm of the TX Relay 130 then the relay cannot be identified, whereas if the key fob 110 is beyond 30 cm from the TX Relay 130 then the relay can be identified. This scenario would be, for example, a thief with a TX Relay in very close proximity (i.e. within 30 cm) of a legitimate key fob.

In an embodiment, the present invention may increase the relay detection performance by reducing the distance further (to be less than 30 cm in this example) by decreasing the acceptable RSSI variation used when creating the subzones, however, in some systems there may be a limit on the memory available and decision making time for the controller and therefore on the number of subzones possible.

An alternative method to this approach is to provide a relay and perform a relay attack and determine whether regions around the relay can be defined by a set of conditions that are only valid for the relay. For instance, if a relay was constructed, it can then be determined whether the range between the TX Relay 130 and the 30 cm key fob distance (used in the previous example—for the sake of convenience) could be exposed during the relay attack. In this situation, it is important that the dynamic range of the relay is as wide as possible, in other words, to create a relay that behaves as closely as possible to a linear, ideal relay.

By constructing such a relay, measurements can be made at the TX Relay 130, in particular, in what may be called the "relay no detection region". These measurement values can then be used to construct subzones in a similar fashion as previously described. However, if an RSSI measurement during a PEPS event corresponds to the set of conditions of these "relay subzones", then the system can conclude that a relay attack has occurred. In order to generate the subzones associated with the relay, measurements must be made in the region around the TX relay 130, in particular, in the "relay no detection region".

Using these RSSI measurements, the maximum RSSI variation allowed within the relay subzone must be determined. If an RSSI measurement during a PEPS event corresponds to the set of conditions of these relay subzones, then the system can conclude that a relay attack occurred. It is critical that the size of the subzones, i.e., the allowed RSSI variation does not allow valid RSSI values in the inclusion zone Z4. It must be determined under all RSSI tolerances that no false relay detections occur at the vehicle 105. The RSSI tolerance may be extended to include the effects of LF noise from electronic devices in close proximity to the key fob.

For example, in FIG. 10, a measurement point at the TX relay 130 that corresponded to RSSI values of 100, 425, 200, and 250 from Antennas 105a, 105b, 105c and 105d respectively. As a starting point an RSSI variation equal to ±20 in order to create the relay subzone. Given this RSSI variation, a subzone can be created with RSSI values of 80 to 120 for Antenna 105a, 405 to 445 for Antenna 105b, 180 to 220 for Antenna 105c and 230 to 270 for Antenna 105d.

This range of values corresponds to the following conditional statement: if (RSSI value from Antenna 105a is between 80 to 120) AND (RSSI value from Antenna 105b is between 405 to 445) AND (RSSI value from Antenna 105c is between 180 to 220) AND (RSSI value from Antenna 105d is between 230 to 270), then the measurement point is within the defined relay subzone. However, now the measurement points around the vehicle 105 must be considered for the relevant inclusion zone Z4.

For example, consider a measurement point in the inclusion zone Z4 of the vehicle that corresponded to RSSI values of 100, 425, 200, and 265 from 105a, 105b, 105c and 105d respectively. Given these values, the measurement point is within the defined relay subzone and this measurement would be wrongly defined as a relay attack and PEPS entry would not be permitted. However, if the RSSI variation is reduced to ±10 counts a subzone with RSSI values of 90 to 110 for Antenna 105a, 415 to 435 for Antenna 105b, 190 to 210 for Antenna 105c and 240 to 260 for Antenna 105d would be provided. In this case, the Antenna 104d value of 265 is outside the range and the measurement would not be detected within the relay subzone.

Figure 11:
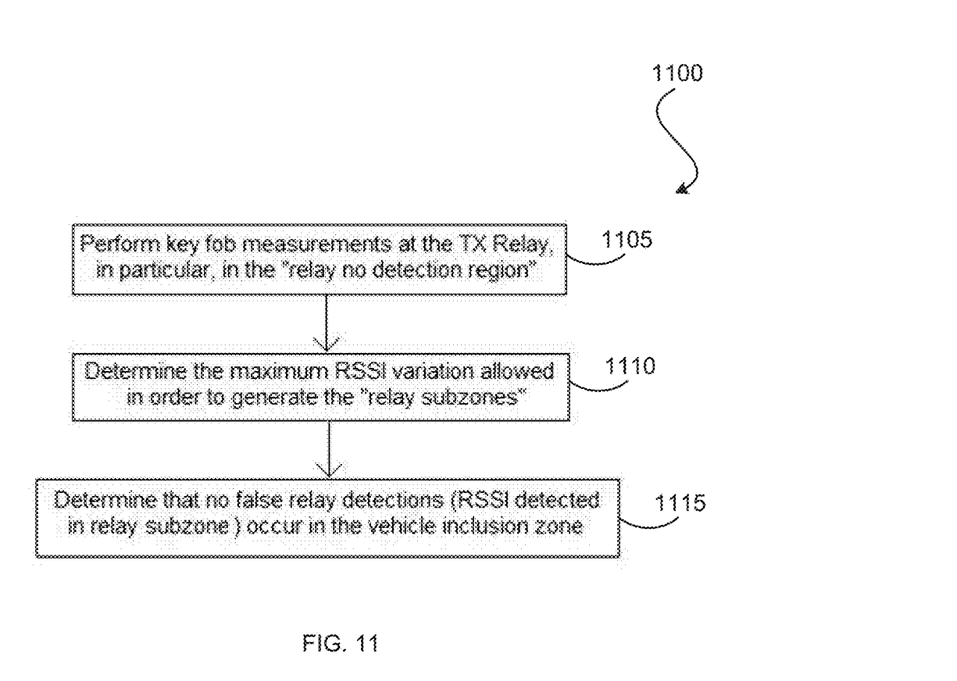
FIG. 11 is a flow illustrating the method associated with creating the relay subzones for preventing a relay attack on a vehicle having a PEPS system.

In operation, as shown in FIG. 11, the method 1100 includes at step 1105, performing key fob measurements at a TX relay before moving to step 1110 in which the maximum RSSI variation allowed in order to generate the "relay subzones" is determined. Control then moves to step 1115 where it is determined under all tolerances that no false relay detections occur in the vehicle inclusion zone.

This process can be applied for all defined relay subzones in order to ensure that no valid RSSI measurement values are inadvertently found in a relay subzone. In addition, the process can be repeated using the relay topology shown in FIG. 4 or any other conceivable relay topology.

Figure 9B:
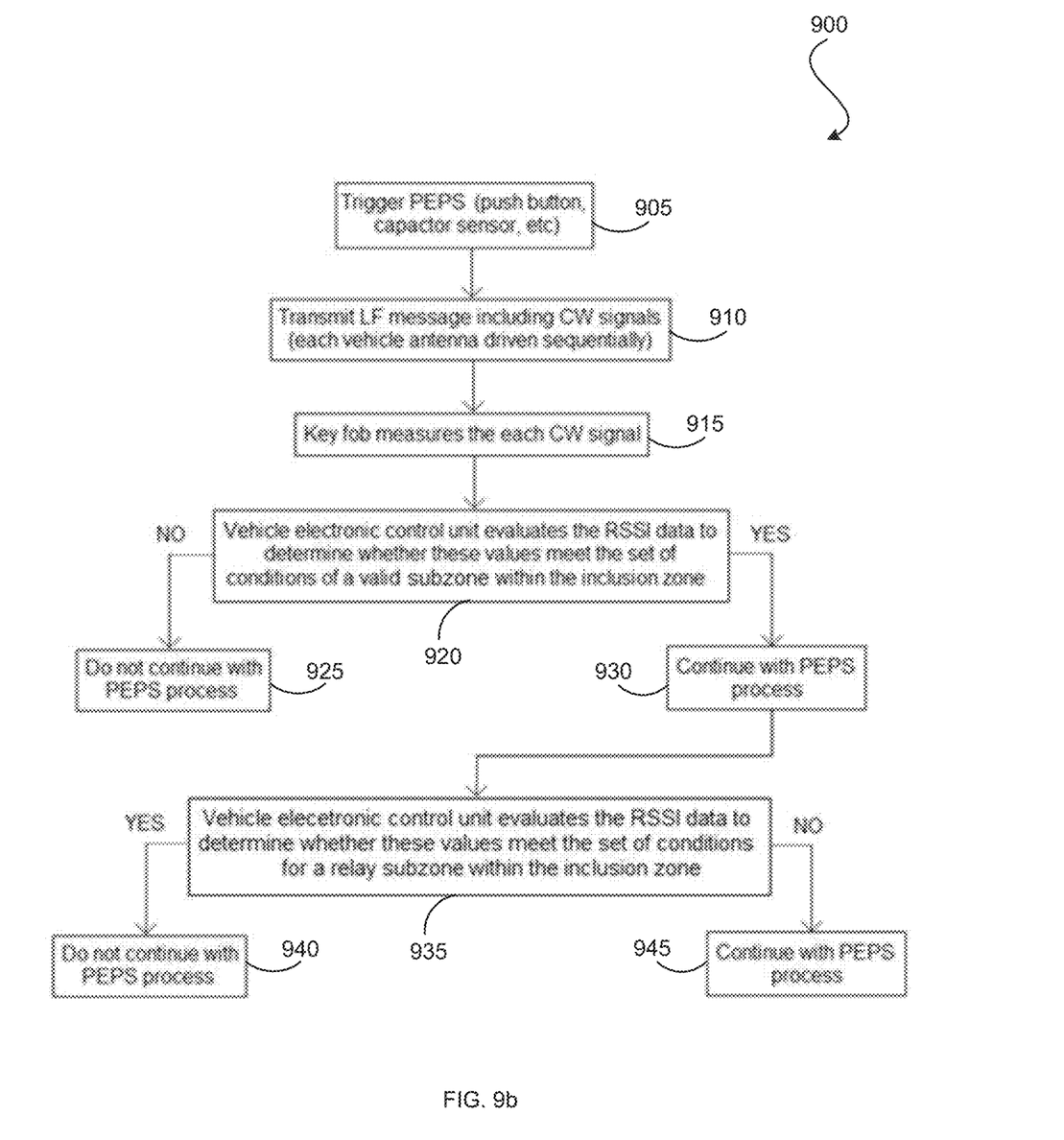

In FIG. 9a, the PEPS system performs a check of the subzone. In FIG. 9b, the process 900 may be updated for a relay subzone check at step 935. It will be appreciated that step 935 can be carried out before or after the subzone check at step 920. During the PEPS process 900, (in addition to the subzone check) each measurement is compared to the set of conditions of all defined relay subzones to determine if any statement is true and valid, i.e., the measurement result falls within a relay subzone. If the conditions are valid then the PEPS entry/start request is not performed at step 940; otherwise if they are valid then the PEPS process 900 continues as required and control moves to step 945 where the vehicle may be unlocked or started.

The claims defining the invention are as follows:

1. A method of detecting if a relay is present in a Passive Entry Passive Start (PEPS) system for a vehicle, the PEPS system including a plurality of predefined subzones within one or more vehicle inclusion zones, the plurality of predefined subzones being sized based on a relationship between a total number of subzones used and an allowable Received Signal Strength Indicator (RSSI) variation value within each subzone, the method including the steps of:
 (a) transmitting a challenge signal including a Low Frequency (LF) telegram transmitted from at least one antenna and Continuous Wave (CW) signals from two or more antennas associated with the vehicle to a key fob, the CW signals being measured by the key fob; and
 (b) determining if CW signals measured by the key fob meet predetermined RSSI magnetic field strength values associated with one or more subzones from the plurality of predefined subzones, the predefined subzones being derived to accept the allowable RSSI variation values of magnetic field distributions at localised positions within a valid inclusion zone and reject magnetic field distributions outside the allowable RSSI variation values generated by a relay at a relay transmitter.

2. The method of claim 1, wherein the PEPS system includes one or more inclusion zones and a plurality of subzones are contained within the inclusion zones.

3. The method of claim 1, wherein the plurality of subzones entirely defines the inclusion zone.

4. The method of claim 1, wherein the subzones overlap with each other.

5. The method of claim 1, wherein each subzone includes a predefined size.

6. The method of claim 1, wherein the magnetic field strength is represented by an RSSI measurement level.

7. The method of claim 1, wherein the predefined size is based on a predefined RSSI variation associated within the RSSI measurement level.

8. The method of claim 1, wherein each subzone has the same size.

9. The method of claim 1, wherein the size of the subzone varies by distance to the two or more antennas.

10. The method of claim 9, wherein the size of the subzones closer to the antennas are smaller than the size of the subzones that are located farther away from the antennas.

11. The method of claim 1, wherein step (b) further includes polling the magnetic field strength of the challenge signals at one or more subzones associated with the location of the key fob.

12. The method of claim 1, wherein step (b) further includes determining movement between adjacent subzones associated with the location of the key fob.

13. The method of claim 1, wherein step (b) further includes determining movement between non-adjacent subzones associated with the location of the key fob.

14. The method of claim 1, wherein the challenge signal is transmitted as a low frequency LF signal.

15. The method of claim 1, wherein signals other than CW signals are transmitted by the vehicle antennas for the magnetic field strength measurements.

16. A system for detecting if a relay is present in a Passive Entry Passive Start (PEPS) system for a vehicle, the PEPS system including a plurality of predefined subzones within one or more vehicle inclusion zones, the plurality of predefined subzones being sized based on a relationship between a total number of subzones used and an allowable Received Signal Strength Indicator (RSSI) variation value within each subzone, the system comprising:
 two or more antennas associated with the vehicle for transmitting a challenge signal from the two or more antennas to a key fob and one or more controllers configured to:
 (a) transmit a challenge signal including a Low Frequency (LF) telegram transmitted from at least one antenna and Continuous Wave (CW) signals from two or more antennas associated with a vehicle to a key fob, the CW signals being measured by the key fob;

(b) determine if the CW signals measured by the key fob meet predetermined RSSI magnetic field strength values associated with one or more subzones from the plurality of predefined subzones, the predefined subzones being derived to accept the allowable RSSI variation values of magnetic field distributions at localised positions within a valid inclusion zone and reject magnetic field distributions outside the allowable RSSI variation values generated by a relay at a relay transmitter.

17. The system of claim 16 where the controller is located in the vehicle.

18. The system of claim 16 where the controller is located in both the vehicle and the key fob.

19. A method of creating subzones within one or more vehicle inclusion zones in a vehicle Passive Entry Passive Start (PEPS) system for use in detecting if a relay is present in the PEPS system, the subzones being sized based on a relationship between a total number of subzones used and an allowable Received Signal Strength Indicator (RSSI) variation value within each subzone, the method comprising the steps of:

(a) predefining an acceptable RSSI variation within a subzone for Continuous Wave (CW) transmissions from the vehicle antennas;

(b) transmitting a challenge signal from two or more antennas associated with the vehicle to a key fob;

(c) the key fob measuring the magnetic field strength of the challenge signal measured at the location of the vehicle inclusion zones;

(d) creating a subzone based on the measured signals, the tolerance of the measured signals and the predefined variation associated with the RSSI measurement level within the subzone;

(e) storing the magnetic field strength values and variation associated with the challenge signal; and (f) repeating steps (b) to (e) to ensure that subzones are created for the complete inclusion zone.

20. A method of detecting if a relay is present in a Passive Entry Passive Start (PEPS) system for a vehicle, the PEPS system including a plurality of predefined relay subzones for one or more vehicle inclusion zones, the relay subzones being sized based on a relationship between a total number of subzones used and an allowable Received Signal Strength Indicator (RSSI) variation value within each relay subzone, the method comprising the steps of:

(a) transmitting a challenge signal including a Low Frequency (LF) telegram transmitted from at least one antenna and Continuous Wave (CW) signals from two or more antennas associated with the vehicle to the key fob, the CW signals being measured by the key fob; and (b) determining if the CW signals measured by the key fob meet predetermined RSSI magnetic field strength values associated with one or more predefined relay subzones from the plurality of predefined relay subzones, the predefined relay subzones being derived to accept the allowable RSSI variation values of magnetic field distributions at the relay transmitter and reject magnetic field distributions outside the allowable RSSI variation values generated at the vehicle inclusion zone.

21. A system for detecting if a relay is present in a Passive Entry Passive Start (PEPS) system for a vehicle, the PEPS system including a plurality of predefined relay subzones for one or more vehicle inclusion zones, the relay subzones being sized based on a relationship between a total number of subzones used and an allowable Received Signal Strength Indicator (RSSI) variation value within each relay subzone, the system comprising:

two or more antennas associated with the vehicle for transmitting a challenge signal from the two or more antennas to a key fob and one or more controllers configured to:

(a) transmit a challenge signal including a Low Frequency (LF) telegram transmitted from at least one antenna and Continuous Wave (CW) signals from two or more antennas associated with a vehicle to a key fob, the CW signals being measured by the key fob;

(b) determine if the CW signals measured by the key fob meet predetermined RSSI magnetic field strength values associated with one or more predefined relay subzones from the plurality of predefined relay subzones, the predefined relay subzones being derived to accept the allowable RSSI variation values of magnetic field distributions at the relay transmitter and reject magnetic field distributions outside the allowable RSSI variation values generated at the vehicle inclusion zone.

22. The system of claim 21 where the controller is located in the vehicle.

23. The system of claim 21 where the controller is located in both the vehicle and the key fob.

24. A method of creating relay subzones for one or more vehicle inclusion zones for a vehicle Passive Entry Passive Start (PEPS) system, for use in detecting if a relay is present in the PEPS system, the relay subzones being sized based on a relationship between a total number of subzones used and an allowable Received Signal Strength Indicator (RSSI) variation value within each relay subzone, the method comprising the steps of:

(a) predefining an acceptable RSSI variation within a relay subzone for Continuous Wave (CW) transmissions from the vehicle antennas;

(b) inserting a relay between the vehicle and a key fob;

(c) transmitting a challenge signal from two or more antennas associated with the vehicle to the key fob;

(d) the key fob measuring the magnetic field strength of the challenge signal at the location of the relay transmitter;

(e) creating a relay subzone based on the measured signals and the predefined variation associated with the RSSI measurement level within the subzone, wherein the relay subzones do not contain valid RSSI measurement values found at the location of the vehicle; and (f) storing the magnetic field strength values and variation associated with the challenge signal.

\* \* \* \* \*